United States Patent
Brodziak (10) Patent No.: US 9,114,388 B2
(45) Date of Patent: Aug. 25, 2015

(54) PROCESS AND INSTALLATION FOR MAKING PROTECTED CATALYST BODIES BY MEANS OF A MOLTEN ORGANIC SUBSTANCE

(71) Applicants: SASOL TECHNOLOGY (PROPRIETARY) LIMITED, Johannesburg (ZA); BASF NEDERLAND B.V., De Meem (NL)

(72) Inventor: Zofia Anna Brodziak, Vaalpark (ZA)

(73) Assignees: SASOL TECHNOLOGY (PROPRIETARY) LIMITED (ZA); BASF NEDERLAND B.V. (NL)

(*) Notice: Subject to any disclaimer, the term of this patent is extended or adjusted under 35 U.S.C. 154(b) by 55 days.

(21) Appl. No.: 14/144,330

(22) Filed: Dec. 30, 2013

(65) Prior Publication Data
US 2014/0120005 A1  May 1, 2014

Related U.S. Application Data

(62) Division of application No. 13/375,696, filed as application No. PCT/IB2010/052240 on May 20, 2010, now Pat. No. 8,759,244.

(60) Provisional application No. 61/183,572, filed on Jun. 3, 2009.

(51) Int. Cl.
*B29C 39/02* (2006.01)
*B29C 39/06* (2006.01)
(Continued)

(52) U.S. Cl.
CPC ............... *B01J 33/00* (2013.01); *B01J 35/026* (2013.01); *B01J 37/0009* (2013.01); *B01J 37/0081* (2013.01); *B01J 37/0219* (2013.01); *B01J 37/0221* (2013.01); *B41D 3/08* (2013.01); *B41D 3/12* (2013.01); *C10G 2/332* (2013.01);
(Continued)

(58) Field of Classification Search
CPC ...... B01J 33/00; B01J 35/026; B01J 37/0009; B01J 37/0081; B01J 37/0219; B01J 37/0221; B01J 2208/00752; B01J 2208/00814; B41D 3/12; B41D 3/08; C10G 2/332; C10G 2300/70
USPC .......................................... 249/119; 425/445
See application file for complete search history.

(56) References Cited

U.S. PATENT DOCUMENTS 2,609,346 A    9/1952  Faulkner
4,664,615 A *  5/1987  Ohtomo et al. ............... 249/119
(Continued)

FOREIGN PATENT DOCUMENTS

EP              0020123 A1   12/1980
WO         WO0196015 A2     12/2001
WO  PCT/IB2010/052240        9/2011

*Primary Examiner* — Joseph S Del Sole
*Assistant Examiner* — Thukhanh T Nguyen
(74) *Attorney, Agent, or Firm* — Fellers, Snider, Blankenship, Bailey & Tippens, P.C.

(57) ABSTRACT

A process for handling an active catalyst includes introducing a mixture of active catalyst particles and a molten organic substance, which is at a temperature $T_1$, and which sets at a lower temperature $T_2$ so that $T_2<T_1$, into a mold. The mold is submerged in a cooling liquid, so as to cool the organic substance down to a temperature $T_3$, where $T_3 \leq T_2$. In this fashion, a casting comprising an organic substance matrix in which the active catalyst particles are dispersed, is obtained.

3 Claims, 3 Drawing Sheets

(51) Int. Cl.
*B01J 33/00* (2006.01)
*B01J 35/02* (2006.01)
*B01J 37/00* (2006.01)
*B01J 37/02* (2006.01)
*C10G 2/00* (2006.01)
*B41D 3/08* (2006.01)
*B41D 3/12* (2006.01)

(52) U.S. Cl.
CPC .......... *B01J2208/00752* (2013.01); *B01J 2208/00814* (2013.01); *C10G 2300/70* (2013.01)

(56) References Cited

U.S. PATENT DOCUMENTS

| | | |
|---|---|---|
| 5,045,519 A | 9/1991 | Meyer et al. |
| 5,733,839 A | 3/1998 | Espinoza et al. |
| 6,294,498 B1 | 9/2001 | Darcissac et al. |
| 6,455,462 B2 | 9/2002 | Van Berge et al. |
| 6,638,889 B1 | 10/2003 | Van Berge et al. |
| 7,179,766 B2 | 2/2007 | Wolfe et al. |
| 7,592,289 B2 | 9/2009 | Van Berge et al. |
| 2003/0087971 A1 | 5/2003 | Steynberg et al. |
| 2004/0121901 A1 | 6/2004 | Wolfe et al. |
| 2007/0254968 A1 | 11/2007 | Agee et al. |

\* cited by examiner

PROCESS AND INSTALLATION FOR MAKING PROTECTED CATALYST BODIES BY MEANS OF A MOLTEN ORGANIC SUBSTANCE

CROSS REFERENCE TO RELATED APPLICATION

This application is a divisional of co-pending U.S. application Ser. No. 13/375,696 filed Dec. 1, 2011, herein incorporated by reference in its entirety for all purposes; which is a national phase application in the U.S. based on PCT/IB2010/052240 filed on May 20, 2010, herein incorporated by reference in its entirety for all purposes; which is a PCT international application which claimed priority to U.S. provisional application No. 61/183,572 filed on Jun. 3, 2009, herein incorporated by reference in its entirety for all purposes.

THIS INVENTION relates to catalysts. It relates in particular to a process for handling an active catalyst, particularly an active Fischer-Tropsch catalyst, and to an installation for producing and handling an active catalyst.

Active Fischer-Tropsch catalysts, ie Fischer-Tropsch ('FT') catalyst precursors which have been reduced thereby to obtain active catalysts, are pyrophoric, and cannot readily be handled and transported, eg due to safety concerns. It is known to coat the active catalyst particles with a wax by forming a catalyst particle/wax mixture using molten wax, and pouring the mixture into drums where the wax solidifies under ambient conditions. The wax thus prevents the active catalyst from oxidizing. The drums can then be transported to a catalyst use site. To use the catalyst, the solid blocks of catalyst/wax mixture must then be removed from the drums, loaded directly into a melting hopper or, prior to loading into the melting hopper, be converted into more manageable pieces.

In U.S. Pat. No. 7,179,766 active catalyst particles are enrobed in a protective coating such as a molten synthetic wax and this mixture is then formed into pastilles. The pastilles are formed in a pastillator by depositing the catalyst and molten coating mixture onto a steel belt cooler. The belt cooler carries the pastilles across a water cooled bed causing the pastilles to solidify by the time they reach the end of the belt. One disadvantage of this process is that a fairly bulky apparatus is required to produce the solidified pastilles, amongst others due to the manner in which the pastilles are cooled in order to solidify.

It is an object of this invention to provide an improved process for handling an active catalyst.

Thus, according to a first aspect of the invention, there is provided a process for handling an active catalyst, which process includes introducing a mixture of active catalyst particles and a molten organic substance, which is at a temperature $T_1$, and which sets at a lower temperature $T_2$ so that $T_2 < T_1$, into at least one mould; and at least partly submerging the at least one mould in a cooling liquid, so as to cool the organic substance down to a temperature $T_3$, where $T_3 \leq T_2$, thereby to obtain a casting comprising an organic substance matrix in which the active catalyst particles are dispersed.

It will be appreciated that the organic material, which is molten at the temperature $T_1$, can be solid at a temperature below $T_2$ e.g. at room temperature. Thus, it sets into a solid state when cooled down to $T_2$ or lower. However, instead, the organic material need not necessarily be a solid at a temperature below $T_2$ such as at room temperature; it can thus merely be in a sufficiently viscous state that it is non-flowable, e.g. it may be in a congealed condition at a temperature below $T_2$. Thus, it then sets into a non-flowable congealed state when cooled down to $T_2$ or lower.

The introduction of the mixture into the at least one mould and the submerging of the at least one mould in the cooling liquid may be effected sequentially, for example the at least one mould may only be submerged in the cooling liquid once the introduction or feeding of the mixture into the at least one mould has ceased. Alternatively, the mixture may be introduced into the at least one mould while the at least one mould is already submerged in the cooling liquid. Instead, the introduction of the mixture into the at least one mould and the submerging of the at least one mould in the cooling liquid may be effected simultaneously. The at least one mould is preferably fully submerged in the cooling liquid i.e. submerged at least up to about the level of the mixture in the at least one mould. Thus, when sufficient of the mixture is introduced into the at least one mould so that the mould is filled, substantially the entire mould will be submerged in the cooling liquid.

Preferably, a plurality of the moulds is used. By having the moulds submerged in the cooling liquid, preferably up to at least about the level of the mixture in the moulds, the molten organic substance is cooled down rapidly to $T_3$. Thus, castings, each comprising, as hereinbefore described, an organic substance matrix in which the catalyst particles are dispersed or embedded, i.e. wherein the catalyst particles are covered by the organic substance, are obtained. Typically, cooling down of the organic substance from $T_1$ to $T_3$ can be effected within a time period, t, where $t \leq 10$ minutes. Typically, t may be about 5 minutes, but can even be less than 5 minutes.

The process may naturally include removing the castings from the moulds. The introduction of the mixture into the moulds, the submerging of the moulds into the cooling liquid and the removal of the castings from the moulds may be effected by means of a casting machine. Such a casting machine or apparatus can be compact so that a substantial catalyst handling space is not required in order to produce commercial quantities of coated active catalyst in the form of the castings.

An active catalyst can be defined as any catalyst precursor which has been subjected to an activation step, typically a reduction step, thereby to form a catalyst which is active for synthesis. More specifically, when the active catalyst is an active Fischer-Tropsch catalyst as hereinafter described, it may be either a freshly reduced catalyst, ie a reduced catalyst that, prior to reduction or thereafter, has not been deactivated through use in a catalytic process, or a reduced regenerated catalyst.

The process may thus include, in a preliminary step, reducing a particulate catalyst precursor to obtain the active catalyst in particulate form.

The catalyst precursor may comprise a catalyst support and at least one compound of an active catalyst component carried on the catalyst support.

The catalyst support may comprise a catalyst support basis and, optionally, one or more modifying components. The catalyst support basis may be selected from the group consisting of alumina in the form of one or more aluminium oxides; silica ($SiO_2$); titania ($TiO_2$); magnesia (MgO); and zinc oxide (ZnO); and mixtures thereof. Preferably, the support basis is selected from the group consisting of alumina in the form of one or more aluminium oxides; titania ($TiO_2$) and silica ($SiO_2$). More preferably, the support basis may be alumina in the form of one or more aluminium oxides. The support basis may be a commercially available product, for example Puralox (trade name) available from Sasol Germany GmbH.

The modifying component may include or consist of Si, Zr, Co, Ti, Cu, Zn, Mn, Ba, Ni, Na, K, Ca, Sn, Cr, Fe, Li, Ti, Sr, Ga, Sb, V, Hf, Th, Ce, Ge, U, Nb, Ta, W, La or mixtures of two or more thereof. More particularly, the modifying component may be selected from the group consisting of Si; Zr; Cu; Zn; Mn; Ba; La; W; Ni and mixtures of two or more thereof. Preferably, the modifying component is selected from the group consisting of Si and Zr. In a preferred embodiment of the invention, the modifying component is Si.

In one preferred embodiment of the invention the catalyst support may comprise a catalyst support basis which, optionally, includes a modifying component selected from Si and Zr, with the catalyst support basis being selected from the group consisting of alumina in the form of one or more aluminium oxides; silica ($SiO_2$) and titania ($TiO_2$). Preferably, the catalyst support basis is then alumina in the form of one or more aluminium oxides and, preferably, it then includes a modifying component. The modifying component is preferably selected from Si and Zr, more preferably Si.

In another preferred embodiment of the invention, the catalyst support may be selected from alumina in the form of one or more aluminium oxides, silica ($SiO_2$), titania ($TiO_2$), magnesia (MgO), silica modified aluminium oxide, and mixtures thereof. Preferably, the support is then a silica modified aluminium oxide. For example, it may then be the product obtainable under the trademark Siralox from Sasol Germany GmbH. Siralox is a spray-dried silica containing aluminium oxide support. The silica modified aluminium oxide support may be the product described in U.S. Pat. No. 5,045,519 which is incorporated herein by reference.

The active catalyst component may, at least in principle, be any suitable active catalyst component; however, it is preferably a component which is catalytically active in a process for synthesising hydrocarbons and/or oxygenates of hydrocarbons from at least hydrogen and carbon monoxide. Preferably, the process is a FT synthesis process. The FT process may be performed in a fixed bed reactor, slurry bed reactor or a fixed fluidized bed reactor. Preferably, the FT process is a three phase slurry bed FT synthesis process The active catalyst component may be a component active for FT synthesis, and may be selected from the group consisting of cobalt (Co), iron (Fe), nickel (Ni) and ruthenium (Ru). Cobalt (Co) is preferred.

The compound of the active catalyst component may be an oxide compound, including an oxy hydroxy compound. In the case where cobalt is the active catalyst component, the compound of cobalt may be a compound selected from the group consisting of CoO, CoO(OH), $Co_3O_4$, $Co_2O_3$ or a mixture of two or more thereof. Preferably, the active catalyst component of cobalt is selected from the group consisting of CoO, CoO(OH) and a mixture of CoO and CoO(OH).

The catalyst precursor may contain cobalt (Co) as an active component at a loading of from 5 to 70 g Co/100 g catalyst support, preferably from 20 to 40 g Co/100 g catalyst support.

The catalyst precursor may also include a dopant capable of enhancing the reducibility of the active catalyst component. The dopant may be in the form of a dopant compound of a metal selected from the group including palladium (Pd), platinum (Pt), ruthenium (Ru), rhenium (Re) and a mixture of two or more thereof. The mass proportion of the metal of the dopant (especially palladium metal or platinum metal) to the active component metal (especially cobalt metal) may be from 0.01:100 to 3:100.

In a preferred embodiment of the invention, the catalyst precursor may comprise a silica modified aluminium oxide catalyst support with a cobalt compound as the compound of the active catalyst component carried on the catalyst support.

While the catalyst precursor can, at least in principle, be any catalyst precursor in solid particulate form and which can be activated by reduction, it may, in particular, be a particulate Fischer-Tropsch synthesis catalyst precursor.

The precursor may be that obtained by employing the following process steps: forming a mixture of the particulate catalyst support, a cobalt compound as an active component precursor, and water; subjecting the catalyst support to impregnation with the cobalt compound; drying the impregnated catalyst support; and calcining the impregnated support to obtain the particulate Fischer-Tropsch synthesis catalyst precursor.

The preliminary step may thus include forming the catalyst precursor by means of the process steps hereinbefore described. In particular, the preliminary step may then include subjecting the calcined support, before the precursor is reduced, to a second impregnation, drying and calcination cycle.

During either, or both, of the impregnation steps, the process may include adding a precursor salt of Pt, Pd, or Ru, or mixtures thereof as a dopant capable of enhancing the reducibility of the catalyst precursor.

The reduction of the catalyst precursor may be effected by contacting the catalyst precursor with a reducing medium. The reducing medium may be a reducing gas such as pure hydrogen or a gaseous mixture containing hydrogen. The catalyst precursor may, in particular, be contacted with the reducing medium at a temperature above 200° C., preferably at a temperature in the range from 250° C. to 550° C., more preferably at a temperature from about 300° C. to about 425° C. The contacting of the catalyst precursor with the reducing medium may be for a period of from 0.5 hours to about 24 hours. It may be carried out at a pressure in the range from ambient to 40 atmospheres.

The individual castings may each have a surface area (in $m^2$) to volume (in $m^3$) ratio of at least 100:1. More particularly, the castings may each have a surface area to volume ratio of at least 150:1, eg the surface area to volume ratio of each may be between 200:1 and 500:1.

The individual castings may have a volume less than 140 ml but preferably more than 2 ml. Preferably, the volume of each casting is less than 60 ml but more than 10 ml.

The castings may be in the form of solid cylinders, ie in the form of candles. The individual candles may each have a length of about 3 cm to about 20 cm. More preferably, the lengths of the candles may be from about 4.5 cm to about 15 cm, typically in the range of about 5.5 cm to about 13 cm.

The candles may each have a diameter of at least 0.7 cm. More preferably, the diameters of the candles may be from about 1.0 cm to about 3.0 cm, typically about 1.6 cm.

The casting into the candles may thus be effected in a casting machine, and the size of the candles will depend on the casting machine used. For example, an automatic rotary casting machine such as that available under the trade name Kuerschner Rotary Moulding Machine from Kuerschner Maschinen GmbH&Co. KG, Nettetal in Germany may be used. The candles will then typically be about 5.5 cm to about 11 cm long and be about 1.0 cm to about 3.0 cm in diameter.

The temperature of the cooling liquid will be dictated by the set, i.e. the solidification or congealing, point $T_2$ of the organic substance. Thus, the cooling liquid may be at ambient temperature, typically at 15° C. to 25° C.; $T_3$ may then also be 15° C. to 25° C. However, instead, the cooling liquid may be maintained at a higher temperature, for example above 25° C., as long as this temperature is still below $T_2$. Thus, when the set point of the organic substance is 80° C. to 120° C. as hereinafter described, the cooling liquid may be maintained at 30° C. to 70° C.; $T_3$ may then also be 30° C. to 70° C. However, more preferably $T_3$ is then 40° C. to 60° C. The cooling liquid may, in particular, be water.

In principle, any organic substance which is in a set condition at ambient temperature, and molten at elevated temperatures, can be used. However, an organic substance which is solid at ambient temperature, is preferred. The organic substance may, in particular, be a hydrocarbon. Preferably, a mixture of hydrocarbons that, while set, preferably solid at ambient conditions, can become molten at a relatively low elevated temperature, may be used. One such mixture of hydrocarbons that can be used is synthetic Fischer-Tropsch (FT) hard wax, with a set or solidification point $T_2$ which is between 70° C. and 140° C., preferably between 80° C. and 120° C., and even more preferably between 90° C. and 110° C. Such hard wax typically has the characteristics or properties as given in Table 1:

TABLE 1

| Congealing Point | 95-103° C. |
| --- | --- |
| Penetration @ 65° C. | <1.5 mm |

There are commercially available products that conform to these properties, for example Sasol Wax H5. Alternatively, Sasol Wax H8 which has different penetration properties may be used. Other than FT products, some ByProduct PolyEthylene (BPPE) waxes also fall in the congealing point range set out hereinbefore, and also have most properties as described above. They can thus also be used in this invention.

Thus, the castings will be cooled down by submerging the filled moulds in the cooling water, to a temperature T3, where T3<T2. Typically, 40° C.≤T3≤60° C., when Fischer-Tropsch hard wax is used.

In the mixture, the mass proportion of catalyst particles to organic substance, preferably wax, may range from 20:80 to 80:20, more preferably 40:60 to 60:40, typically about 50:50.

At the time of introducing the mixture into the moulds, the mixture may be at a temperature above 135° C., when FT hard wax is used, and may typically be at a temperature in the range 135° C. to 145° C., ie 135° C.≤T1≤145° C.

The process may also include forming the mixture of active catalyst particles and molten organic substance. Preferably, the mixture is formed by low shear stirring of the active catalyst particles into the molten organic substance.

The process may include loading the castings into a bulk container such as a bag, a drum or the like, so that the bulk container contains a number of the castings.

The process may further include sealing off the bulk container. The castings can thus be transported, by means of the bulk container, to a catalyst use site.

The casting may be effected under an inert atmosphere, such as a nitrogen blanket, to protect the active catalyst particles or reduced catalyst precursor from oxidation by air.

According to a second aspect of the invention, there is provided an installation for producing and handling an active catalyst, which process includes catalyst production or regeneration equipment, including a catalyst coating tank;

conveying means for conveying a mixture of active catalyst particles and a molten organic substance from the catalyst coating tank;

at least one mould into which the conveying means can discharge the mixture of active catalyst particles and molten organic substance; and a cooling bath adapted to contain a cooling liquid in which the at least one mould can be submerged at least partly.

The conveying means may include a pipe leading from the catalyst coating tank, with a spout being provided at the free end of the pipe.

A plurality of the moulds may be provided. The moulds and cooling bath may form part of a casting machine, in particular an automatic rotary casting machine.

The installation may include a conveyer for conveying castings of active catalyst particles embedded in an organic substance matrix from the casting machine. The conveyor may comprise an elevator.

By casting the active FT synthesis catalyst into candles in accordance with the invention, the Applicant has also found that the active catalyst can be safely transported from a manufacturing site to a catalyst use site.

However, apart therefrom that the active catalyst must be safely transported, it must also, once introduced into a FT synthesis reactor, still provide the necessary catalyst conversion performance.

The Applicant has found that when the active FT synthesis catalyst is cast into candles in accordance with the invention, desired catalyst conversion performance is achieved when the active catalyst is thereafter used for FT synthesis.

The invention will now be described in more detail with reference to the accompanying drawings.

Figure 1:
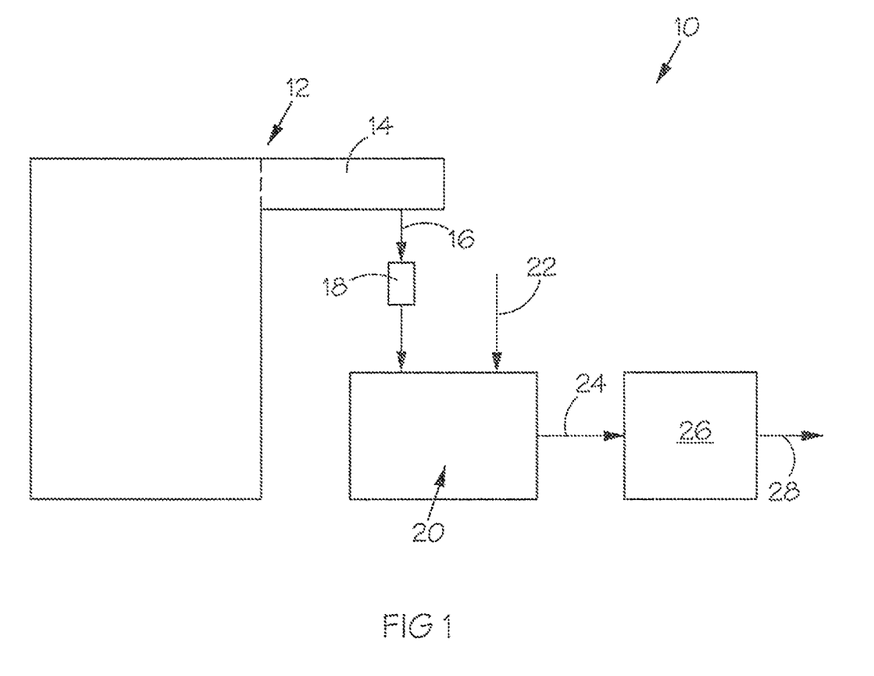
FIG. 1 is a flow diagram of a process according to the first aspect of the invention for handling an active Fischer-Tropsch synthesis catalyst.

Referring to FIG. 1, reference numeral 10 generally indicates a process according to the first aspect of the invention for handling an active Fischer-Tropsch synthesis catalyst.

A catalyst production stage, generally indicated by reference numeral 12, is provided upstream of the process 10. The catalyst production stage 12 includes a coating or feeding tank 14 from which leads a heated and partly flexible pipe 16 fitted with a spout 18.

The spout 18 is located above an automatic rotary casting machine, which forms part of the process 10. The automatic rotary casting machine can be that available under the trade name Kuerschner Rotary Moulding Machine from Kuerschner Maschinen GmbH&Co. KG, Nettetal in Germany. The casting machine is generally indicated by reference numeral 20. The casting machine 20 includes a rotatable table (not shown) divided into, for example, six sections, with each of the sections equipped with, for example, 256 cylindrical moulding tubes (not shown), to give a total of, for example, 1536 moulding tubes. Substantially the entire lengths of the moulding tubes are submerged in a cooling bath (not shown) which is supplied with a flow of tempered cooling water. The cooling bath temperature is maintained in the range of 30° C. to 70° C., preferably in the range of 50° C. to 60° C., by a heat exchanger (not shown) which is cooled with regular cooling water entering along a flow line 22. This temperature is selected to ensure that the cylindrical castings or candles that are cast in the moulding tubes congeal and then completely solidify within a short period of time, typically ten minutes or less. Each cylindrical moulding tube or mould is equipped, at its bottom, with a hydraulic piston for ejection of solid cylindrical castings cast therein.

A castings conveyor 24 leads from the machine 20 to a loading stage 26, from which any suitable packaging (e.g. bulk bags or drums), filled with castings, can be removed at 28.

The catalyst production stage 12 operates in known fashion, and produces a supported Fischer-Tropsch catalyst precursor comprising a precursor of an active metal such as cobalt, supported on a metal oxide support, such as alumina ($Al_2O_3$), with or without a promoter such as Pt. The catalyst precursor is reduced, under a hydrogen containing atmosphere, to produce an active Fischer-Tropsch synthesis catalyst in particulate form. The particulate catalyst is mixed, in the coating or feeding tank 14 which is under continuous low shear stirring to avoid settling of the catalyst, with, for example, molten Sasol Fischer-Tropsch hard wax (H5) in a about 50:50 ratio by mass, to form a mixture. The hard wax has a congealing point (T2) in the range 95-103° C. The coating or feeding tank 14 is maintained at a temperature (T1) above this, typically at about 135° C., to ensure that the wax is fully molten.

The Sasol Fischer-Tropsch H5 wax typically has the characteristics or properties given in Table 1.

The particulate catalyst/molten wax mixture formed in the coating or feeding tank 14 is transferred via the line 16 and the spout 18 into the casting machine 20. The line 16 will typically be equipped with a regulating valve (not shown) to ensure constant flow of the mixture as required by the machine specification. The coating or feeding tank 14 is typically fitted with a mixer or agitator (not shown), to ensure that the catalyst particles remain in suspension in the molten wax.

As set out hereinbefore, the cooling bath of the casting machine 20 is maintained at a temperature in the preferred range 50° C. to 60° C. The actual temperature will be determined by routine trial or experiment, to allow for proper filling of the moulding tubes with mixture followed by rapid solidification of the cast mixture into castings in each of the moulds. Thus, T3 (temperature to which castings are cooled down) is from 50° C. to 60° C.

Molten mixture is poured on the surface of the rotating table of the casting machine 20. The cylindrical moulds depend from the rotating table. The molten mixture is protected against oxidation by a nitrogen blanket. Mixture fills the moulds by gravity. The moulds are submerged in the cooling bath effectively up to the level of the mixture in the moulds i.e. the cooling bath extends up to close to the upper edges of the moulds. Excess mixture that remains on the table ("cake"), is removed by means of a scraper (not shown) which gently lifts the cake from the surface of the rotating table. In doing so, the cake crumbles or breaks into pieces. In case the cake pieces are too large, they can be broken into smaller pieces, by means of any method known in the art. Subsequently, the cake pieces may be recycled to the coating or feeding tank 14, or loaded together with the candles.

The solid cylindrical castings or candles formed in the moulding cylinders are removed by means of the hydraulic pistons, collected and conveyed by the conveyor 24, optionally together with the broken pieces of cake, to the packaging stage 26 where they are loaded (dumped) into bulk packaging containers in the form of either drums or bulk bags (not shown). The drums or bulk bags (which are preferably provided with frames) will typically be mounted on pallets (not shown) with each pallet typically containing four drums or one bulk bag. The pallet with the empty packaging container(s) will thus be conveyed to the packaging station 26, which may be equipped with a rotating section which will allow each drum on the pallet to be filled separately without the necessity for changing the position of a spout (not shown) through which the castings and optionally the broken pieces of cake pass. It is envisaged that a packing line will accommodate at least two pallets before and at least two pallets after the filling point, to ensure smooth filling operation.

The candles typically are in the form of solid cylinders having a diameter of about 16 mm and a length of about 105 mm, and thus have a surface area (in m2) to volume (in m3) ratio of about 270:1.

A standard casting machine can thus be used in this invention, and bulk transporting of the catalyst from the production facility to the use site in the form of candles in bags or drums, in accordance with the invention, is possible.

Figure 2:
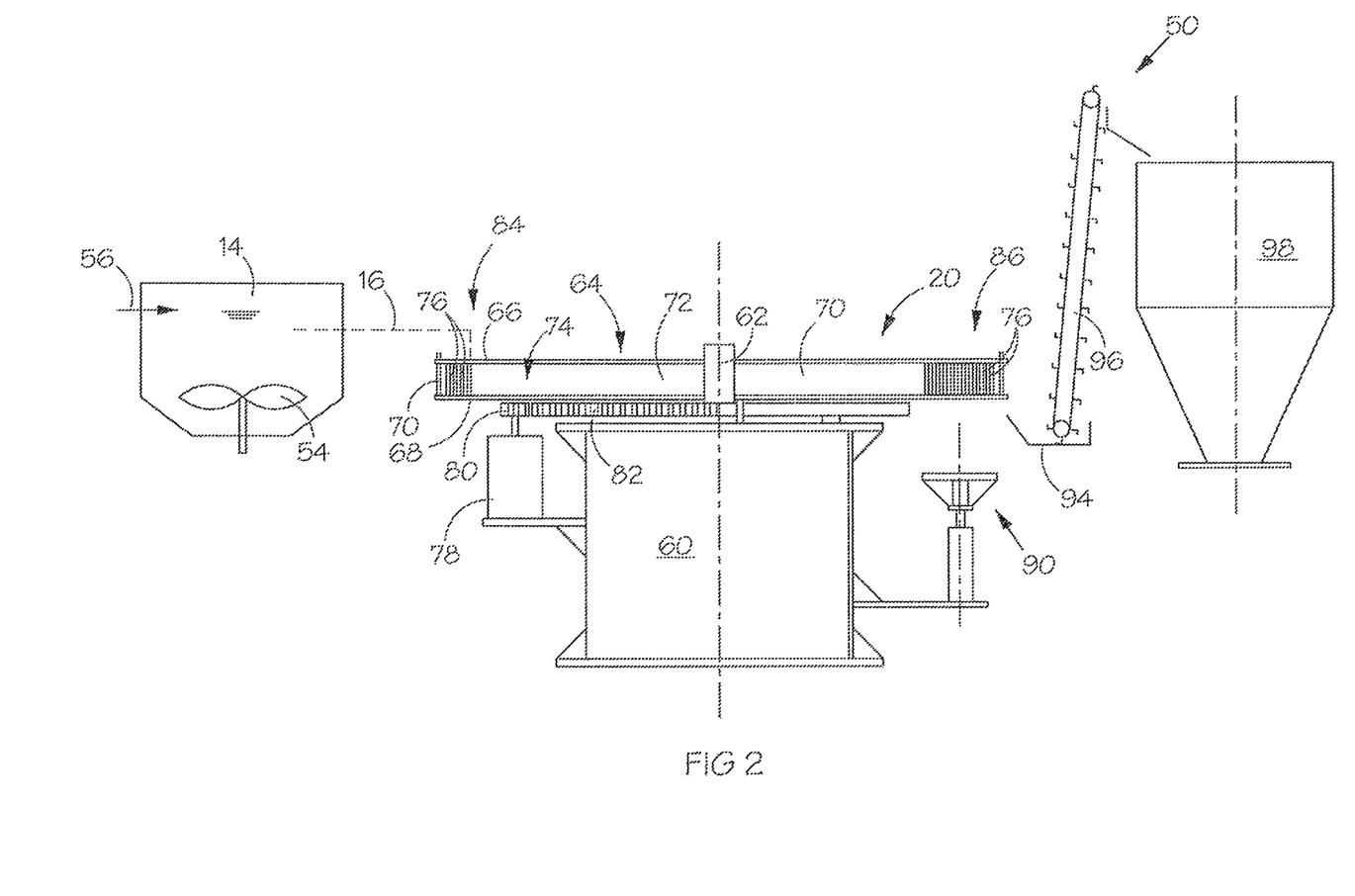
FIG. 2 shows, in diagrammatic fashion, part of an installation according to the second aspect of the invention, for producing and handling an active Fischer-Tropsch synthesis catalyst.
Figure 3:
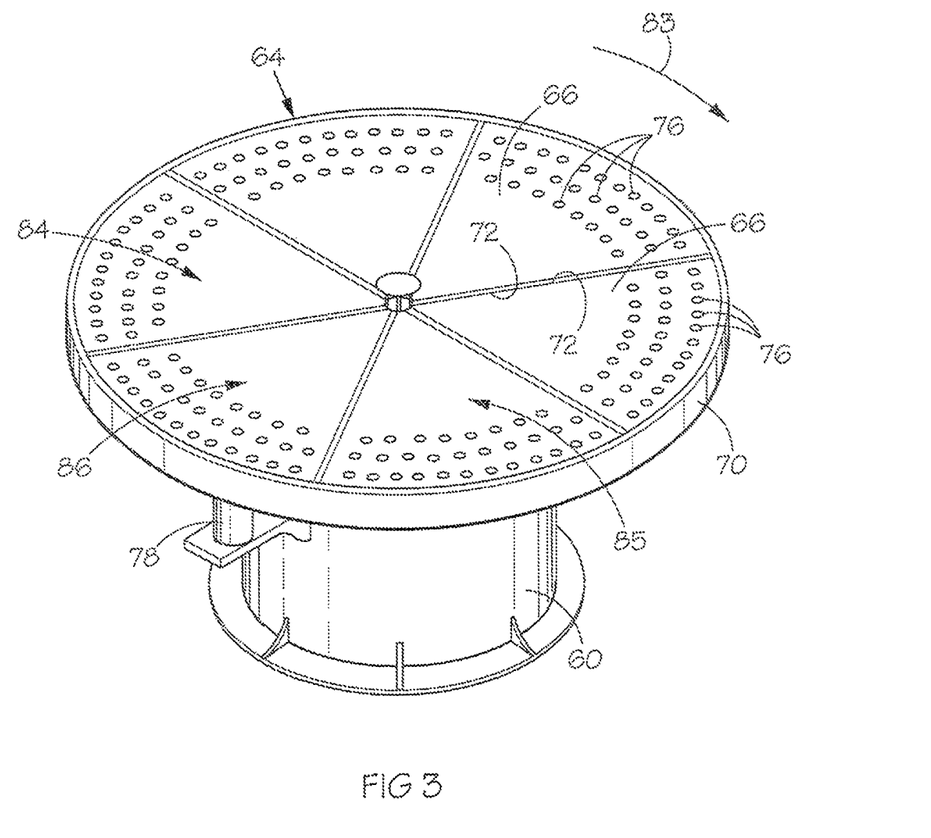
FIG. 3 shows a three-dimensional view from the top, of the casting machine shown in FIG. 2.

Instead, however, an installation according to the second aspect of the invention, part of which is shown in FIGS. 2 and 3, can be used to produce and handle the active Fischer-Tropsch synthesis catalyst.

In FIGS. 2 and 3, parts which are similar to those indicated in FIG. 1, are indicated with the same reference numerals.

In FIGS. 2 and 3, reference numeral 50, generally indicates an installation for producing and handling an active Fischer-Tropsch catalyst.

In the installation 50, the coating or feed vessel 14 may be provided with an anchor agitator 54, and is designed to feed the mixture or slurry of the active Fischer-Tropsch synthesis catalyst particles in the molten Fischer-Tropsch wax to the casting machine 20 at a desired flow rate and mixture temperature, typically 135° C. It is thus provided with heating coils (not shown) for heating the catalyst/wax mixture, as well as with a nitrogen feed line 56 for creating a nitrogen blanket inside the vessel, thereby to maintain an inert atmosphere within the vessel 14. The agitator 54 may be a slow rotating anchor agitator which avoids destruction of the catalyst particles and eliminates any unstirred zones at the bottom of the vessel 14.

The catalyst/wax mixture, in use, passes from the vessel 14 to the casting machine 20 along the pipe 16 which may be fitted with a flow meter (not shown) and a control valve (not shown).

The casting machine 20 comprises an upright cylindrical base 60 on which is rotatably mounted, via an axle 62, a rotating table 64. The table 64 comprises upper and lower plates 66, 68 respectively as well as a continuous peripheral extending outer plate 70 closing off the peripheral edges of the plates 66, 68. The rotatable table 64 is divided into six sections, as shown most clearly in FIG. 3. Each table section thus comprises an upper plate 66, a lower plate 68 and, optionally, an outer plate 70, as well as, optionally, side plates 72 which thus also serve to segregate adjacent table sections from each other. In embodiments where the side plates 72 are employed, they preferably do not project above the upper plate 66. A cooling bath 74 is thus defined by each table section and in particular between the plates 66, 68, 70 and 72. Each section of the rotatable table 64 also contains a plurality of cylindrical moulding tubes 76 arranged towards the outer periphery of the table. In FIG. 3, the moulding tubes are shown to be arranged in three radially disposed rows in each of the six sections. In an alternative embodiment (not shown), the moulding tubes may be arranged in a rectangular configuration in each of the six sections.

The table 64 is driven to rotate by an hydraulic motor 78 mounted to the base 60 and pinion gears 80, 82, as indicated in FIG. 2.

The pipe 16 is adapted to feed the catalyst particles/molten wax mixture in a feed zone 84 located next to a discharge zone 86. Between feeding the casting or candle machine and discharging it, the table rotates 300 degrees, in the direction of arrow 83, as indicated in FIG. 3. In the discharge zone 86, castings or candles that have been moulded in the moulds 76 are discharged by means of a piston ejector, generally indicated by reference numeral 90. More particularly, each cylindrical moulding tube or mould is equipped, at its bottom, with a hydraulic piston for ejection of solid cylindrical castings cast therein. Thus, the piston ejector 90 ejects the candles formed in the moulds 76.

The installation 50 also includes a conveyer system 94 for receiving ejected castings, and optionally a Z-shaped bucket elevator 96, for transferring the castings from the installation 50 to a hopper 98 forming part of the packaging stage 26 (see FIG. 1). In an alternative embodiment the hopper 98 may be replaced by an elevator (not shown) for receiving the castings and lowering them into the drums or the like.

In use, catalyst particles/molten wax mixture is introduced into the moulding tubes 76 of the rotating table 64, in the feed zone 84. The mixture is poured onto the surface of the rotating table at constant flow. The temperature of the table surface, ie of the upper plate 66 of each section, is set in such a manner that the slurry fills the moulding tubes 76 completely. The excess of slurry left on the table forms a cake after solidification. By the time that the table 64 has rotated through 300°, in steps of 60°, so that the moulding tubes 76 reach the discharge position or zone 86, the wax of the mixture has solidified (due to cooling by cooling water in the cooling baths and the fact that the moulds are submerged in the cooling water effectively up to the level of the mixture in the moulds i.e. up to near the upper ends of the moulds) so that mouldings or castings are formed in the tubes 76. These castings are removed from the tubes 76 in the zone 86 by means of the pistons. The movement of the table 64, together with a diverter arm (not shown) located above the table, directs the mouldings or castings towards the conveyor 94. The stream of castings entering the conveyor 94 is optionally joined by pieces of the cake which forms on the plate 66 of the table 64 and which is broken up into the pieces ahead of the discharge zone 86. Thus, the cake pieces can be removed with the mouldings or castings, or separately. If the cake pieces are removed separately it will be done in a zone 85 ahead of the zone 86 (see FIG. 3).

The casting machine is provided with two heat exchangers (not shown) for regulating the temperature of the cooling water in the cooling bath 74 in the table sections.

It will be appreciated that, generally, a catalyst production stage or manufacturing plant 12 is space constrained, and the coating of the catalyst particles with wax normally needs to be effected within a small space. The Applicant has found that a standard casting machine as hereinbefore described, is compact and will easily fit into existing catalyst manufacturing plants, since it typically occupies a footprint of about 2 m×2 m. Such casting machines are also relatively mobile and hence easy to move around. Furthermore, being able to produce the castings with a casting machine has further advantages (as compared to forming castings in drums as hereinbefore described) since the casting machine has a high output resulting from the short cooling times required for the small castings, bearing in mind also that the castings are water cooled and not air cooled, as are conventional drum castings. The use of moulds also allows the castings to be at least partially submerged in the water thereby reducing cooling times, especially if compared to the cooling apparatus disclosed in U.S. Pat. No. 7,179,766. Still further, the moulds limit or prevent direct contact of the castings and the cooling liquid; such direct contact would have a negative impact, e.g. as regards catalyst activity, on any catalyst particles not fully covered by wax. Due to the short cooling periods the active catalyst is more evenly distributed throughout the individual castings.

It will be appreciated that, with the process and installation of the present invention, the catalyst/wax matrices are supplied to the point of use, i.e. a Fischer-Tropsch synthesis reactor, in the form of smallish castings or candles rather than large blocks in drums. Such drums typically have a volume of 200 l, and the solid blocks hitherto formed in such drums thus have surface area by volume ratios of about 10:1.

Still further, the Applicant believes that the active Fischer-Tropsch synthesis catalyst will provide satisfactory performance.

It is believed that the reasons why good catalyst conversion performance can be maintained with the process of the present invention include (i) minimal catalyst particle shear in the process 10, and (ii) production of a uniform and free-flowing form of catalyst.

It is also believed that using candles having dimensions as hereinbefore specified can give rise to further advantages. For example, too small artefacts of the hydrocarbon matrix with catalyst particles embedded therein, can lead to handling problems and/or ineffective protection of the catalyst particles which may result in oxidation of the catalyst particles at the outer surfaces of the artefacts, bearing in mind also that the smaller the artefacts, the greater the proportion of catalyst particles (relative to the total number of catalyst particles in the artefact) at the outer surfaces of the artefact.

The process and installation of the present invention thus provides a viable technical solution for safe and economical handling, transportation and reactor loading of active Fischer-Tropsch synthesis catalysts, without jeopardizing inherent properties of the catalyst.

Example 1

Comparative

Preparation Catalyst 1

A 30 g Co/0.075 g Pt/100 g (1.5 g Si/100 g Puralox SCCa 2/150) slurry phase Fischer-Tropsch synthesis ("FTS") catalyst was prepared on a particulate modified 1.5 g Si/100 g Puralox SCCa 2/150 (trademark) pre-shaped support using aqueous slurry phase impregnation and drying, followed by direct fluidised bed calcination as disclosed generally in U.S. Pat. No. 5,733,839, U.S. Pat. No. 6,638,889 and U.S. Pat. No. 6,455,462, which are hence incorporated herein by reference. Puralox SCCa 2/150 is a pure pre-shaped gamma-alumina particulate catalyst support, and is prepared by calcination of boehmite. However, in this case the support had been modified, during manufacture thereof, so that it contained 1.5 g Si/100 g support. For this manufacture, the procedure used was as is described in U.S. Pat. No. 6,638,889. The calcined catalyst precursor was reduced in hydrogen at 425° C., as generally disclosed in U.S. Pat. No. 10,480,778.

Wax Coating/Shaping

The reduced catalyst was allowed to cool down to about 140° C. at which stage the hydrogen was replaced by nitrogen, and the catalyst unloaded in molten Fischer-Tropsch wax in a coating tank under the protection of an nitrogen blanket. This wax/catalyst mixture was loaded into 200 liter drums, in which it could solidify.

Example 2

According to the Invention

Cobalt FTS catalyst was manufactured according to the same procedures as in Example 1, except for the shaping step.

Cylindrical castings were made as follows:

2.5 kg of the catalyst/wax mixture at a temperature of about 140° C. was loaded into the moulds of a manual candle making machine, while the water cooling of the candle making machine was kept at about 50° C. It took about 10 minutes for the candles to solidify, after which they were unloaded by using hydraulic pistons. About 100 candles of a diameter of 2 cm and a volume of 30 ml each were made. The excess catalyst/wax mixture formed a thin cake on the surface of table and was removed gently by means of a scraper, before the pistons were activated and the candles unloaded.

Example 3

The catalyst samples from Examples 1 and 2 were tested for Fischer-Tropsch synthesis performance. The Fischer-Tropsch synthesis performance of the cobalt catalyst was tested as follows:

Reactor temperature: 230° C.
Reactor pressure: 17 bar
Catalyst inventory: ca. 15 gram
pace velocity: 5000 mln/g cat/h
Syngas conversion (%): 60
H2:CO inlet ratio: 1.6:1
Argon internal standard: 12 vol %

The results are shown in Table 2 and it can be seen that catalysts 1 and 2 perform the same during realistic Fischer-Tropsch synthesis.

TABLE 2

|  | Catalyst Example 1 (comparative) Catalyst 1 | Catalyst of Example 2 (according to invention) Catalyst 2 |
| --- | --- | --- |
| Run | BD072 | 107 K |
| FT rate (mole CO converted/g cat/s) | $1.31 \times 10^{-5}$ | $1.37 \times 10^{-5}$ |
| CH$_4$ (%) | 5.0 | 5.1 |
| CO$_2$ (%) | 1.9 | 1.6 |

The Particle Size Distribution (PSD) analysis on Catalysts 1 and 2 are shown in Table 3 and it can be concluded that PSD of both Catalysts 1 and 2 is the same.

TABLE 3

|  | Catalyst of Example 1 (comparative) | Catalyst of Example 2 (according to invention) |
| --- | --- | --- |
| Fraction smaller than 50 micron (vol %) | 1.8 | 1.6 |

It can thus be concluded that the inventive catalyst handling and shaping method is a process that:

- uses an item of equipment with a small footprint
- can be executed easily
- creates catalyst/wax shapes that can be handled easily
- does not have a negative impact on the FTS performance or on the PSD analysis.

The invention claimed is:

1. An installation for producing and handling an active catalyst, which installation includes
    catalyst production or regeneration equipment, including a catalyst coating tank;
    conveying means for conveying a mixture of active catalyst particles and a molten organic substance from the catalyst coating tank;
    a casting machine for casting castings in the form of candles, which casting machine includes a plurality of moulds into which the conveying means can discharge the mixture of active catalyst particles and molten organic substance, and a cooling bath adapted to contain a cooling liquid in which the moulds can be submerged at least partly.

2. An installation according to claim 1, wherein the conveying means includes a pipe leading from the catalyst coating tank, with a spout being provided at the free end of the pipe.

3. An installation according to claim 1, which includes a conveyer for conveying castings of active catalyst particles embedded in an organic substance matrix from the casting machine.

* * * * *